(12) United States Patent
Atmur et al.

(10) Patent No.: US 7,698,029 B2
(45) Date of Patent: Apr. 13, 2010

(54) AUTONOMOUS ASSET TRANSPORTATION METHOD, APPARATUS AND COMPUTER PROGRAM PRODUCT

(75) Inventors: Robert J. Atmur, Whittler, CA (US); Ronald A. Kubinski, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/194,161

(22) Filed: Aug. 19, 2008

(65) Prior Publication Data

US 2010/0049383 A1 Feb. 25, 2010

(51) Int. Cl.
G06F 17/00 (2006.01)
(52) U.S. Cl. ...................................................... 701/19
(58) Field of Classification Search ............. 701/19–20, 701/23, 25
See application file for complete search history.

(56) References Cited

U.S. PATENT DOCUMENTS

| | | | |
|---|---|---|---|
| 2002/0072833 A1* | 6/2002 | Gray | 701/19 |
| 2005/0131645 A1* | 6/2005 | Panopoulos | 701/214 |
| 2005/0223812 A1* | 10/2005 | Denis | 73/799 |
| 2008/0154452 A1* | 6/2008 | Kapp et al. | 701/20 |
| 2008/0162034 A1* | 7/2008 | Breen | 701/202 |

* cited by examiner

*Primary Examiner*—Kim T Nguyen
(74) *Attorney, Agent, or Firm*—Alston & Bird LLP (57) ABSTRACT

A method, computer apparatus and computer program product are provided for autonomously transporting an asset along a track to a destination in a manner that is safe, reliable and quick. In regards to the method, instructions are received relating to the shipment of the asset to the destination. Based upon the instructions, a track-based route along which the asset is to be transported to the destination is then automatically determined. In order to automatically determine the track-based route, the integrity of the track and/or the track bed may be determined. When determined necessary in order to transport the asset to the destination, the track may be automatically reconfigured, such as by closing or opening appropriate switches. Further, the movement of the asset may be controlled in an autonomous manner along the track while continuing to monitor at least that portion of the track between the asset and the destination.

20 Claims, 3 Drawing Sheets

AUTONOMOUS ASSET TRANSPORTATION METHOD, APPARATUS AND COMPUTER PROGRAM PRODUCT

FIELD OF THE INVENTION

Embodiments of the present invention relate generally to the transportation of an asset to a destination and, more particularly, to the autonomous transportation of an asset to a destination.

BACKGROUND OF THE INVENTION

It is relatively commonplace to need to ship an asset from one location to another, that is, to a destination. While such shipment may be relatively straightforward in many instances, such as when ample time exists for the shipment and when the asset is lightweight and/or relatively small or the like. However, in some instances, the shipment of an asset to a destination can be relatively complex, such as in instances in which the asset is quite large and/or extremely heavy, is combustible, explosive or otherwise presents a danger if mishandled and/or must be transported extremely rapidly.

For example, in a military context, certain weapons, such as a rocket booster having an attached warhead, may need to be shipped from a staging or storage area to a destination for launch. In this scenario, the rocket booster and associated warhead is extremely heavy, oftentimes weighing, for example, about 200,000 pounds. As such, the rocket booster with associated an warhead can only be transported via certain modes of transportation, such as via a railcar. Additionally, the speed with which the rocket booster and associated warhead may be transported over the track may also be limited by the size and weight of the rocket booster and associated warhead since care must be taken to ensure that the rocket booster and associated warhead safely travel over the tracks in a controlled fashion without excessive acceleration, deceleration or other forces which could adversely affect the rocket booster and associated warhead.

As a result of the need to transport the rocket booster and associated warhead in a controlled fashion, the transportation of the rocket booster and associated warhead along the tracks has generally been controlled by a person that may walk or ride along the tracks with the rocket booster and associated warhead. While this approach is generally sufficient in terms of moving the rocket booster and associated warhead from the storage or staging area to its intended destination from which it may be launched, the inclusion of a person in the transportation process for controlling the movement of the rocket booster and the associated warhead limits the speed with which the rocket booster and associated warhead may be transported from the storage or staging location to its intended destination.

In some instances, it may be desirable to transport assets that are a challenge to transport, such as due to weight, size, explosiveness, etc., more quickly than is permitted by a transportation process that requires a person to be integrally involved. As such, it would be desirable to provide an improved technique for transporting assets, such as assets that pose particular challenges to their shipment, such as assets that are heavy, large, explosive or the like, that can safely and reliably transport the asset to an intended destination in a relatively quick fashion.

BRIEF SUMMARY OF THE INVENTION

According to some embodiments of the present invention, a method, computer apparatus and computer program product are provided for transporting an asset along a track to a destination in a manner that is safe, reliable and quick. In this regard, embodiments of the present invention provide an autonomous technique for transporting an asset along a track to a destination, thereby eliminating the need to have a person involved in the transport so as to permit the transportation of the asset to be performed not only in a controlled and safe manner, but also in a very responsive and quick manner as may be demanded in certain applications. For example, embodiments of the present invention permit a rocket booster having an associated warhead to be safely shipped from a supply or other storage location to an intended destination from which the rocket booster will be launched in an autonomous manner, thereby permitting the rocket booster and associated warhead to be shipped expeditiously.

In one embodiment, a method for transporting an asset along a track to a destination is provided. The method receives instructions relating to the shipment of the asset to the destination. Based upon the instructions, the method then automatically determines a track-based route along which the asset is to be transported to the destination. In order to automatically determine the track-based route, the method may determine the integrity of the track. The method may determine the integrity of the track in various manners including, for example, the inspection of the track itself and/or the track bed by various means, including radio frequency (RF) signals, infrared (IR) signals or time domain reflectometry (TDR). The method may also determine if the track needs to be reconfigured to transport the asset. When it is determined that the track does need to be reconfigured, the method may also automatically provide for the reconfiguration of the track, such as by closing or opening appropriate switches. Further, the method of embodiments of the present invention may then control the movement of the asset in an autonomous manner along the track while continuing to monitor at least that portion of the track between the asset and the destination.

While monitoring at least that portion of the track between the asset and the destination during the movement of the asset, a lack of integrity of the track may be detected. In this regard, the track-based route may be dynamically modified to avoid at least that portion of the track that lacks integrity. Thus, the method of embodiments of the present invention may adapt to problems that are identified with respect to the track and/or the track bed during the movement of the asset and appropriately reroute the asset so as to arrive at the destination, albeit by a different route than that originally determined.

In one embodiment, a method is provided that further includes monitoring of the asset while the asset is being moved along the track. For example, the asset may be monitored by a thermal sensor, a strain gauge, radio frequency (RF) signals, infrared (IR) signals or video signals. The asset may be moved along the track in railcar such that the railcar may also be monitored during its movement along the track. As such, any changes to the asset or the railcar as well as the application of any unexpected forces to the asset or railcar may be identified in order to prevent damage to the asset or railcar, thereby providing information regarding potential threats to the asset or railcar.

In addition to monitoring the integrity of the track during the movement of the asset, regions forward and aft of the asset may also be monitored while the asset is moving along the track. As such, suspicious behavior or other potential threats to the asset or railcar may be identified. The method of one embodiment of the present invention also provides for automated access to a source of the asset, such as to a secure storage or staging area.

According to other aspects of the present invention, a computing apparatus for providing for the transportation of an asset along a track to a destination is provided that includes a processor for performing the various functions described above. Additionally, a computer program product including at least one computer-readable storage medium having computer-readable program instructions stored therein may be provided with the computer-readable program instructions including program instructions for performing the various functions described above. By transporting the asset along a track to a destination in an autonomous manner, the need for human involvement or intervention is reduced or eliminated such that the time required for transporting the asset from the storage or other staging area to the destination may be reduced, thereby allowing the asset to desirably be deployed in a more rapid fashion. Not only is the transportation of the asset to a destination performed in an autonomous manner in order to increase the speed with which the asset is transported to the destination, but the monitoring of the integrity of the track both prior to shipment of the asset in order to determine the route to be taken by the asset, but also during the shipment of the asset, as well as the monitoring, in some embodiments, of the asset, the railcar carrying the asset and/or regions forward and aft of the asset during the shipment of the asset facilitates the safe and reliable shipment of the asset.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
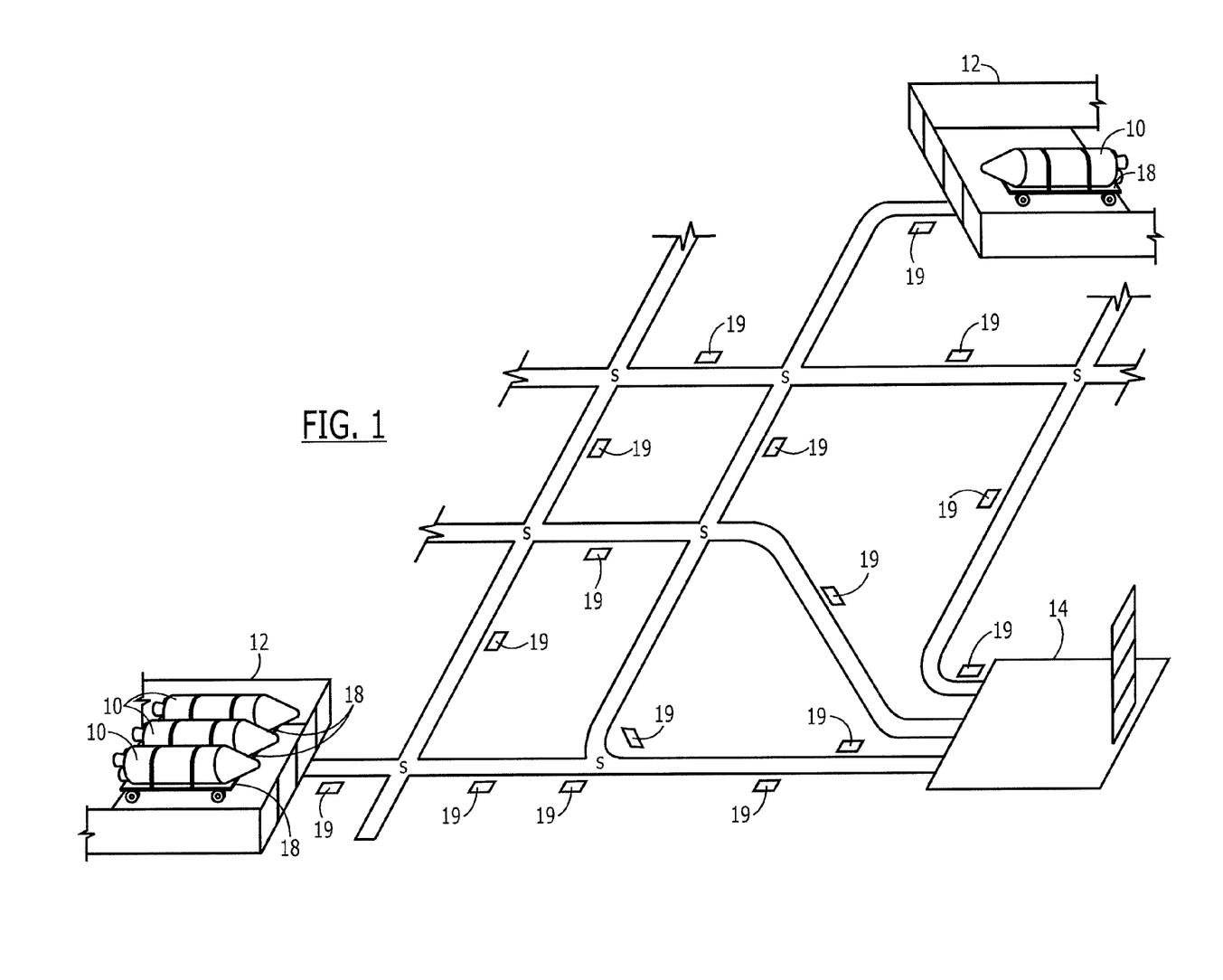
FIG. 1 is a schematic representation of a system for transporting an asset from a source along a track-based route to a destination with a plurality of sensors disposed along the tracks according to one exemplary embodiment to the present invention.

In a number of situations, it may be desirable to transport an asset 10 from a source 12 to a destination 14. In this regard, embodiments of the present invention may be configured for transporting a variety of different types of assets. However, in one embodiment, the asset is one that is relatively heavy, relatively large, and/or explosive, combustible, inflammatory or otherwise poses a risk during handling. In this regard, the asset will be hereinafter described as a rocket booster having an associated warhead. However, reference to the asset as a rocket booster having an associated warhead is provided for purposes of example and is not intended to be limiting with respect to the types of assets that may be transported in accordance with embodiments to the present invention.

A source 12 of the asset 10 may be the current location of the asset or, in any event, the location of the asset at the time that the shipment of the asset is to commence. For example, the source of the asset may be a storage location, a staging area or the like. In some instances, the source of the asset is secured such that appropriate authorization is required in order to obtain access to the asset. As described below, the transportation of the asset to the destination 14 may therefore include obtaining access to the asset, such as by providing proper authentication for access to the source of the asset.

The destination 14 for the asset 10 may be any location that can be identified, such as by name, geographical coordinates or the like, and to which the asset may be transported. In one embodiment in which the asset is a rocket booster having an associated warhead, the destination is the location from which the rocket booster will be launched. As the foregoing example illustrates, the destination may also be secured such that proper authorization is required in order to access the destination. As described below, the shipment of the asset to the destination may, for some embodiments, therefore include obtaining access to the destination, such as by providing appropriate authorization for access to the destination.

As shown in FIG. 1, a plurality of tracks 16, such as railroad tracks, extend in various routes between the source 12 and the destination 14. As such, the tracks provide a mechanism by which to ship the asset 10 from the source to the destination. Since the asset may be quite heavy, such as about 200,000 pounds in some instances with respect to a rocket booster having an associated warhead, the tracks permit shipment of such a heavy asset, even though the weight of the asset eliminates many other modes of transportation from consideration. As shown schematically in FIG. 1 and as described below, a plurality of sensors may be positioned along the tracks for monitoring the tracks including, for example, the tracks themselves and/or the track bed prior to shipment of the asset and, in some embodiments, during the shipment of the asset.

Figure 2:
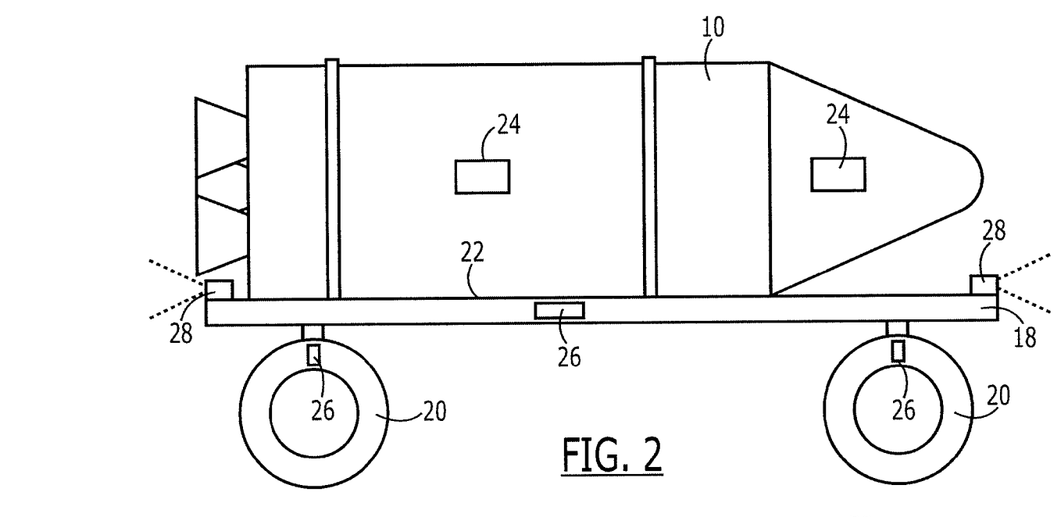
FIG. 2 is a schematic representation of a railcar carrying an asset, such as a rocket booster having an associated warhead, and including a plurality of sensors for monitoring the asset, the railcar and regions forward and aft of the railcar.

As described above, in conjunction with FIG. 1, the asset 10 is shipped via a track-based route. As such, the asset may be carried by a railcar configured to run along a series of track segments that extend continuously from the source 12 to the destination 14. As such, a railcar carrying an asset and, in particular, a rocket booster having an associated warhead is depicted in FIG. 2. As shown, the railcar includes a plurality of wheels 20 for engaging the track as well as a platform 22 upon which the asset is disposed. In this regard, although the asset is shown to be disposed upon a relatively flat platform, the platform may be differently configured in order to more snuggly receive the asset in other embodiments, if so desired. In any event, the asset may be secured to the railcar such as by means of tie downs, clamps, chains or the like.

As described below the asset 10 may include or have mounted thereupon a plurality of sensors 24 for monitoring the asset and, in one embodiment, for monitoring various health-related perimeters associated with the asset. Additionally, the railcar 18 may include or have disposed thereupon a plurality of sensors 26 for monitoring the railcar and, in one embodiment, for monitoring health-related perimeters associated with the railcar. Further, monitors or other sensors 28 may be carried by the railcar for monitoring regions proximate to the railcar, such as regions forward and/or aft of the railcar and/or regions to one or both sides of the railcar.

Figure 3:
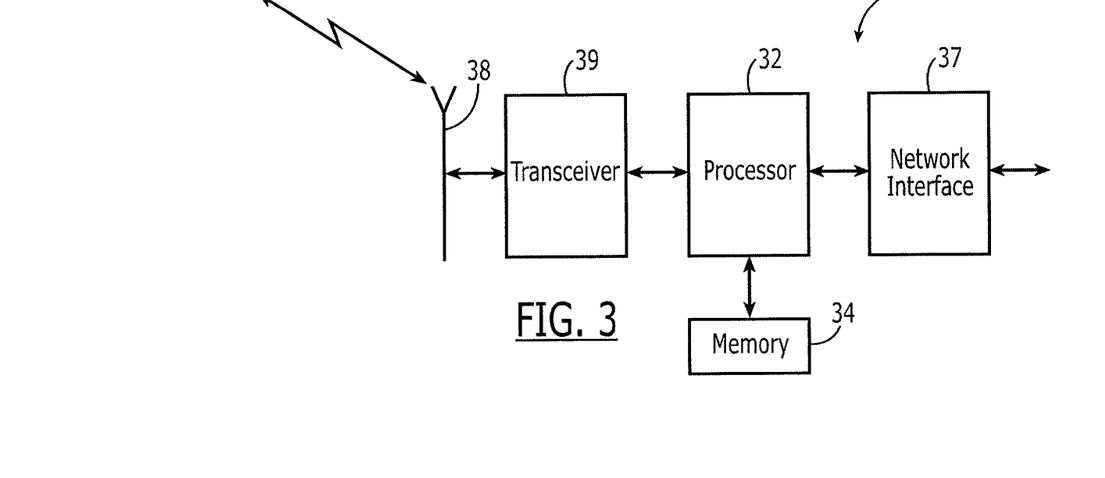
FIG. 3 is a block diagram of a computing apparatus for communicating with various sensors in accordance with one embodiment of the present invention.

As shown in FIG. 3, a computing apparatus 30 may be provided in accordance with embodiments to the present invention for controlling the transportation of the asset 10 to the destination 14. In this regard, a computing apparatus generally include a processor 32, such as a controller, a microprocessor, or any of a variety of computing devices including personal computers, servers or the like. As described below, based upon instructions received by the computing apparatus from a variety of sensors, a track-based route may be determined and the asset may then be moved along the track-based route to the destination in an autonomous manner and under the control for the computer apparatus. In one embodiment, the processor is configured to execute the plurality of computer program instructions that may be stored in memory 34 and accessed by the processor in order to transport the asset along the track 16 to the destination.

Figure 4:
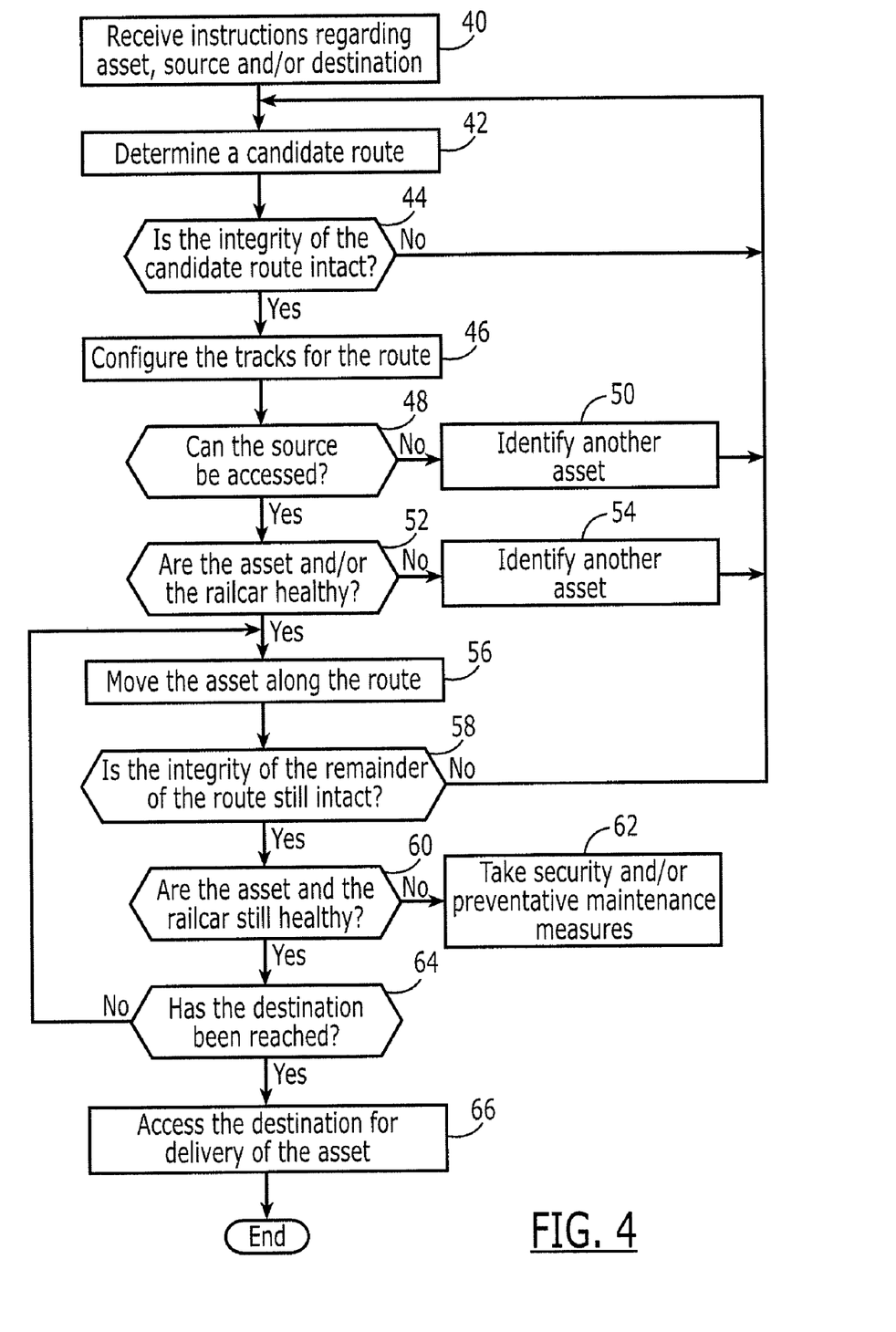
FIG. 4 is a flowchart of the operations to be performed for transporting an asset to a destination in accordance with one embodiment to the present invention.

As shown in block 40 of FIG. 4, the transportation of an asset 10, such as a rocket booster having an associated warhead, may commence by receipt of an instruction by the computing apparatus 30 that indicates that the asset is to be transported to a destination. The instruction that commences the transportation of the asset may be provided by various entities, such as a military commander, a logistics operator or the like. Moreover, the instruction may be provided to the computing apparatus in various manners, such as via a wireline network, a wireless network or by direct entry via a user interface 36 associated with the computing device. In instances in which instructions are provide via a wireline network, the computing apparatus generally include a network interface 37 for communicating with the wireline network. Similarly, in an embodiment in which the computing apparatus is configured to receive the instruction via a wireless network, the computing apparatus may include an antenna 38 and an associated receiver, transmitter and/or transceiver (hereinafter individually and collectively termed a "transceiver 39") for facilitating communicating via the wireless network. Further, in embodiments in which the computing apparatus is configured to receive the instructions via direct entry, a computing apparatus may include the keypad, a touch screen or any other form of user interface for permitting a user to enter instruction for subsequent execution by the processor.

The instruction regarding the transportation of an asset 10 along a track 16 to a destination 14 may provide various levels of detail. In embodiments in which each asset is to be transported to the same destination, the instructions can, but need not identify the destination since the processor 32 may be configured to provide for the transportation of the asset to the common destination absent instructions to the contrary. Similarly, in instances in which the same type of asset is always transported, the instruction can, but need not, specify the type of asset. In contrast, the processor may be configured to provide for the transportation of the common type of asset, at least absent instructions to the contrary. However, in instances in which a variety of types of assets may be transported in accordance with embodiments to the present invention, the instructions may specify the type of asset to be transported. Similarly, in instances in which an asset may be delivered to a plurality of destinations, the instructions may identify the destination to which the asset is to be transported.

The instructions received by the computing apparatus 30 may also identify the source 12 of the asset 10. However, the computing apparatus may be configured such that the source of each different type of asset is predefined and known in advance by the computing apparatus. In instances in which the instructions do not specify the source, therefore, the computing apparatus may determine an appropriate source, such as the source closest to the destination, the source from which the asset may be most quickly obtained or in some other manner, based upon the source(s) that are known by the computing apparatus to be storing the particular type of asset.

Once the computing apparatus 30 has received the instructions, the computing apparatus automatically determines a track-based route along which the asset 10 is to be transported to the destination 14. See block 42 of FIG. 4. In this regard, the computing apparatus initially determines a source 12 and the destination for the asset. As described above, the source and the destination may be provided by the instructions that are received by the computing apparatus or may be determined by the computing apparatus based upon the stored information. Based upon the source and the destination, the computing apparatus and, in particular, the processor 32 can determine one or more candidate routes extending from the source to the destination. In order to determine the candidate routes, the processor may store or otherwise have access to information that defines the plurality of track segments in the vicinity of and extending between the source and destination. In this regard, the information regarding the tracks may identify, such as by means of geographical coordinates, the opposed ends of a track segment as well as other information regarding the track segment, such as its length, its maximum slope, an indication of whether the slope is upward, downward or both and the identification of any other track segments that are intersected and the like. Based upon the information regarding the plurality of track segments, the processor can construct one or more track-based routes, each consisting of one or more track segments that are continuous and that extend from the source to the destination.

In embodiments in which the processor 32 constructs a plurality of track-based routes, i.e., candidate routes, from the source 12 to the destination 14, the processor can then consider each of the candidate routes and identify one of the routes as the track-based route via which to transport the asset 10 from the source to the destination. This determination may be performed in various manners depending upon the relative importance (or weighting) of different parameters to the transportation of the asset.

In instances in which the speed with which the asset may be transported is of paramount concern, the processor 32 may be configured to evaluate a plurality of candidate routes based upon the length of each route from the source 12 to the destination 14 with the processor selecting the shortest route as the route along which the asset is to be transported since the shortest route will likely provide for the correspondingly shortest time in transit. Alternatively, for an asset that is particularly fragile, dangerous or the like, the processor may be configured to evaluate the plurality of candidate routes based upon the number of turns and/or the number of incline or decline track sections with the processor configured to select the candidate route having the fewest turns and/or the fewest incline or decline track sections as the route along which the asset is to be transported since a route that is relatively straight and flat will likely permit the asset to be shipped in a more secure manner with the asset being subjected to fewer forces during the transportation process. By way of further example, for an asset that is particularly heavy, the processor may be configured to evaluate a plurality of candidate routes based upon the steepness of any incline or decline along the route. The processor of this embodiment could then select the route having the least steep incline or decline as the route along which the asset is to be transported so as to limit any potential situations in which the computer apparatus 30 could lose control of the railcar 18 on a relatively steep descent or ascent. While several examples of parameters that may be considered by the processor in order to evaluate a plurality of candidate routes have been provided, these examples are provided by way of explanation and are not intended to be limiting as the processor may be configured to evaluate a plurality of candidate routes according to a wide variety of different parameters (or combinations of parameters) depending upon the application.

Once the processor 32 has determined the desired route along which the asset 10 is to be transported to the destination 14, the processor can determine the integrity of the track 16 along the route. See block 44 of FIG. 4. In this regard, the computing apparatus 30 can communicate with a plurality of sensors or other monitors 19 for evaluating the integrity of the track itself as well as the integrity of the track bed that supports the track. A variety of different sensors may be provided in order to monitor the integrity of the track.

For example, time domain reflectometry (TDR) techniques may be utilized in which a sensor applies an electrical signal to the tracks 16 and then subsequently monitors the tracks for a reflection of the signal. A reflection may be caused, for example, by a break in the track or the end of the track. Based upon the speed at which the electrical signals propagate along the tracks, the time lapse between the application of the electrical signal to the track and the detection of any return or reflected signal can be converted to a distance from the location at which the electrical signal is applied to the location along the tracks that caused the reflection; be it a break in the tracks or the end of the tracks. If the reflected signals indicate that the reflections were created by an intermediate portion of the track, as opposed to the known end of the track, the reflected signals may be indicative of a break in the track that should be avoided.

Additionally, or alternatively, radio frequency (RF) sensors and/or infrared (IR) sensors may be positioned along the tracks 16 as shown in FIG. 1 to emit signals that are incident upon the tracks and the underlying track bed and to receive reflected or other responsive signals. By examining the RF and/or IR return signals, a determination as to the integrity of the tracks and the condition of the track bed may be provided. In this regard, an RF sensor that emits and receives RF signals may be responsive to metallic materials, such as those that form the track as well as those in the track bed, such as the metallic components of various rocks that comprise a track bed. While an RF sensor may emit RF signals having various wavelengths, an RF sensor configured to emit RF signals having a millimeter wave length may permit the metallic tracks as well as metallic elements of the track bed to be inspected. By evaluating the return signals, such as based upon a comparison to historical return signals that were captured when the track and track bed were known to be integral, information is provided regarding the integrity of the track and underlying track bed.

Additionally, an IR sensor may comparably illuminate the track 16 and track bed with IR signals and then capture the return signals for evaluation in order to determine the integrity of the track and/or track bed. In this regard, an IR sensor is particularly useful in instances in which the track is shrouded in fog as an IR sensor can evaluate the integrity of the track and the track bed, as well as identify objects that may be obstructing the track, such as rocks, trees or the like, even in instances in which visibility is limited. Still additional types of sensors may be employed, such as video cameras that capture images of the track and the underlying track bed that may be visually examined to determine the integrity of the track and track bed.

Regardless of the type of sensor, the sensors 19 are advantageously positioned so as to inspect the entire length of track 16 from the source 12 to the destination 14. With respect to RF, IR and video sensors, for example, a plurality of sensors may be positioned along the length of the tracks with each sensor configured to inspect a respective section of the track such that the combination of the sensors inspect the entire length of the track.

The sensors 19 are configured to communicate with the computer apparatus 30, such as by means of a wireline or a wireless connection, such that the computer apparatus can receive the data collected by the various sensors. The sensors can provide the data to the computer apparatus in various forms. In embodiments in which the sensors themselves include a processor or other computing device for evaluating the return signals and for identifying locations in which the track appears to be broken and/or the track bed appears to be suspect or otherwise weakened, the sensors may merely provide the computing apparatus with an indication that either the track and track bed appear to be integral or that one or more breaks or other irregularities that have been identified along the track, along with the location of each break or other irregularity. Alternatively, the sensors may merely collect the return signal and then provide the return signals themselves to the computing apparatus for subsequent evaluation by the computing apparatus in order to identify breaks or other irregularities with the tracks, as well as the location of any such breaks or irregularities.

Moreover, the sensors 19 may be configured to continuously or repeatedly monitor the tracks 16 and to provide the resulting information to the computing apparatus 30. Or, the sensors may be more passive in that the sensors only monitor the tracks or at least only report information regarding the integrity of the tracks to the computing apparatus in response to an inquiry from the computing apparatus, such as provided following the determination of a route from the source 12 to the destination 14.

Based upon the information regarding the integrity of the track 16, the processor 32 can determine if the route is passable or whether another route should be identified. If the information provided by the sensors 19 indicates that the track along the desired route is integral and no problems are identified with the track or the underlying track bed, the computing apparatus 30 may continue the process as described below to transport the asset 10 along the desired route. Alternatively, if the signals provided by the sensors indicate that the track no longer has sufficient integrity, such as by being broken, having some problem associated with the track bed or being blocked by some object, the processor may determine an alternative route between the source 12 and destination 14 that does not include that portion of the initial route that was identified to have a problem, i.e., to lack integrity. In this regard, the processor may reconsider the candidate routes that were previously determined and select the next most advantageous route that does not include the problematic portion of the track. The track segments along this new route may then be evaluated based upon signals provided by sensors along the track segments that form the new route, and those signals may be evaluated to determine if the new route is integral or also includes one or more problematic portions. This process may continue until the processor identifies a route from the source to the destination that includes track segments that are integral.

Once the processor 32 has identified a route having tracks 16 that are integral from the source 12 to the destination 14, the processor may determine if the tracks must be reconfigured in any fashion in order to permit the asset to move along the track-based route from the source to the destination and, when it is determined that the track does need to be reconfigured, the processor may automatically provide for reconfiguration of the track. See block 46 of FIG. 4. For example, the processor may store or have access to information that defines the current position of the switches (designated S in FIG. 1) throughout the track network and may be configured to control those switches in order to connect the track segments that form the intended route such that the assets may be transported therealong without being diverted onto any other track segment.

The processor 32 then endeavors to obtain the desired asset 10 from the source 12, such as a storage or other staging area. See block 48 of FIG. 4. In instances in which access to the source is secured, the processor may be configured to provide appropriate authorization to the source in order to obtain access to and remove the asset from the source. For example, the processor may be configured to provide a password or other authorization code to the source in order to obtain possession of the asset. In instances in which the source does not accept the authorization provided by the processor or in instances in which the asset is otherwise not available from the source, the processor may be configured to identify another source having the same type of asset and may then endeavor to obtain possession of the asset from the other source. See block 50 of FIG. 4. As will be apparent, the change in the source of the asset may require the processor to again determine a route from the new source to the destination 14 and to verify the integrity of the new route in the manner described above.

Once the processor 32 has confirmed the availability and accessibility of the asset 10 from the source 12, the processor may determine the health or other status information associated with the asset and/or the railcar 18 carrying the asset. See block 52 of FIG. 4. As shown in FIG. 2, for example, a plurality of sensors 24, 26 may be mounted upon the asset and/or the railcar and may provide data to the processor indicative of the health or status of the asset and/or the railcar. While a variety of sensors may be employed, exemplary sensors include thermal sensors, strain gauges, RF sensors, and video sensors for monitoring various aspects of the asset and/or railcar, such as the temperature, the applied force(s), or the like. Additionally, the asset and/or the railcar may be configured to perform a built-in test, such as of the electronics onboard the asset and/or the motive power or other features onboard the railcar. The data collected by the various sensors and/or the results of the built-in tests conducted by the asset and/or the railcar may be provided to the processor. The processor, in turn, can evaluate the data and can determine if the asset and the railcar appear to be in good health and in condition for safe transport, such as by comparing the data provided by the sensors and/or provided as a result of the built-in test(s) to predetermined or historical values. In instances in which the processor determines the health of the asset and/or the railcar to be acceptable, the transportation of the asset to the destination 14 can commence. Alternatively, if the processor determines the health of the asset and/or railcar to be suspect, the processor can identify another asset of the same type, either at the same or a different source and can then repeat the foregoing process in regards to the transportation of the newly-identified asset, in lieu of the previously identified asset. See block 54 of FIG. 4.

In instances in which the integrity of the track 16 along the intended route has been confirmed, the track has been appropriately configured the health of the asset 10 and/or the railcar 18 has been confirmed, and the asset may be accessed from the source 12, the processor 32 is configured to commence movement of the asset and, in particular, the railcar carrying the asset along the tracks that make up the intended route. See block 56 of FIG. 4. In one embodiment, the movement of the railcar is autonomous, that is, without physical connection to any external device, such as any external motive force. As such, the railcar may include a motor, such as one or more batteries and an associated electric motor(s), for powering the railcar and causing its movement along the tracks. Regardless of its configuration, the railcar and, in particular, the motive force of the railcar operates under control of the processor. As such, the processor can issue a signal, such as via wireless connection between the computing apparatus 30 and the railcar which initiates the motor and which thereafter controls the speed at which the motor drives the railcar and, correspondingly, the application of brakes to the wheels of the railcar.

In this regard, the control provided by the processor 32 is advantageous in certain embodiments in which it is desirable to transport the asset 10 from the source 12 to the destination 14 as quickly as possible while taking into account any limitations upon the maximum speed and/or the maximum acceleration/deceleration to which the asset can safely be subjected. Thus, the processor, with its knowledge of the route and, more particularly, its knowledge of the inclines and declines associated with different segments of the route can appropriately drive the motor onboard the railcar to move the railcar at the desired speed, while causing the application of the brakes of the railcar in order to avoid excess velocity, such as may otherwise occur upon the descent of the railcar along a downhill portion of the track. Since the asset may often be quite heavy, such as 200,000 pounds or more in the case of a rocket booster having an associated warhead, the processor advantageously prevents the railcar from moving too rapidly, such as along a downhill portion of the track, since the momentum generated by the railcar and the asset could quickly become very large, rendering it relatively difficult to stop, at least in a short distance without exceeding the maximum deceleration to which the asset could be safely subjected.

According to embodiments of the present invention, the processor 32 continues to monitor the portion of the track 16 along the intended route that is between the asset 10 and the destination 14. See block 58 of FIG. 4. In this regard, the processor can communicate with the sensors 19 to monitor that portion of the track along the intended route between the asset and the destination in the same manner described above. If the processor detects no problems with the track along the intended route between the asset and the destination, the transportation of the asset along the intended route proceeds. Alternatively, if the processor identifies a problem with track or the underlying track bed between the asset and the destination, such as may have occurred by the falling of a tree across the track after the asset has commenced its trek from the source 12, the processor can then evaluate the information regarding the track network and determine an alternative route from the current location of the asset (as opposed to the original source of the asset) to the destination. As described above, the processor can identify a plurality of candidate alternative routes and the integrity of the candidate alternative routes can be evaluated by the processor in cooperation with the sensors in sequence from the most desired of the candidate alternative tracks to the least desired of the candidate alternative tracks until one of the candidate alternative tracks is identified that is integral and exhibits no problems. The processor can then reconfigure the tracks, such as by controlling the actuation of certain switches along the tracks in advance of the railcar in order to shift the railcar from the original route to the alternative route that has now been identified in order to avoid the lack of integrity or other problem identified along the original route. As before, the processor can continue to monitor the integrity of the track along this alternative route as the asset is moved therealong and can further detour the asset along yet another alternative route if necessary to avoid any potential problem that is subsequently identified.

In addition to monitoring the track 16 along the intended route and between the asset 10 and the destination 14, the processor 32 can continually or repeatedly monitor the asset and/or the railcar 18 to determine the health of the asset and/or the railcar. See block 60 of FIG. 4. In this regard, the processor can communicate with the sensors 24, 26 described above that are carried by the asset and/or the railcar in order to receive data indicative of the health of the asset and/or the railcar. In instances in which the health of the asset and/or the railcar is acceptable, the transportation of the asset along the intended route may continue. However, if the processor determines that the health of the asset and/or the railcar is unacceptable, such as by not satisfying certain predetermined conditions or deviating by more than an acceptable amount from the historical norms, the transportation of the asset may be slowed or the transportation of the asset may be halted to permit an inspection of the asset and/or the railcar prior to further damage to the asset and/or the railcar or the asset may be returned to the source or other inspection depot for inspection. See block 62 of FIG. 4.

In addition to monitoring the track 16 between the asset 10 and the destination 14 and monitoring the health of the asset and/or the railcar 18 during the transportation of the asset along the intended route, the processor 32 may also monitor regions proximate the railcar, such as regions forward and/or after the railcar as well as regions to either or both sides of the railcar. In this regard, the railcar can include video cameras or other sensors 28 that provide video images, such as via a wireless connection, to the processor. The processor can then evaluate the images in order to detect any suspicious or threatening activity, such as the unexpected or undesired presence of individuals or other objects along the track. In addition or as an alternative to the video cameras, the railcar may include other types of sensors for interrogating the regions proximate the railcar, such as RF sensors, IR sensors, or the like. If no problems are identified in the regions proximate the railcar, the processor continues the transportation of the asset along the intended route to the destination. However, if any potential problem or suspicious behavior is identified in the regions proximate the railcar, movement of the railcar may be halted or, alternatively, security personnel may be dispatched to investigate the scene.

The processor 32 therefore continues the transportation of the asset 10 along the intended route to the destination 14. See block 64 of FIG. 4. Upon reaching the destination, the asset may be removed from the railcar, the railcar may be returned to the source 12 or other holding area, and the asset may then be used in the desired manner, such as by being launched in the case of a rocket booster having an associated warhead. In some instances, access to the destination may also be secured and, in these instances, the processor may also be configured to provide appropriate authorization to the destination, such as a password or other authorization code, in order to permit entry of the railcar and the asset to the destination. See block 66 of FIG. 4.

While controlling the determination and configuration of the route (as well as any subsequent determination and configuration of alternative routes) as well as the movement of the asset 10 along the intended route with the processor 32, the asset may be transported from the source 12 to the destination 14 in a completely autonomous manner, that is, without involving any person. As such, the speed and responsiveness with which an asset may be moved from a source to a destination may be increased, thereby meeting or surpassing the requirements of future deployment systems which will require rapid delivery and utilization of the assets. By employing a system of rails that, in turn, may be appropriately configured by the processor, assets that are quite heavy, that are large and/or that may be somewhat dangerous may be transported in a safe and effective manner.

According to one exemplary aspect of an embodiment of the present invention, the processor 32 may operate under control of a computer program product. The computer program product for directing the performance of one or more functions of exemplary embodiments of the processor includes a computer-readable storage medium, such as the non-volatile storage medium, e.g., memory 34, and software including computer-readable program code portions, such as a series of computer instructions, embodied in the computer-readable storage medium.

In this regard, FIG. 4 is a flow diagram of a method and program product according to exemplary embodiments of the present invention. It will be understood that each block or step of the control flow diagram, and combinations of blocks in the control flow diagrams, may be implemented by various means, such as hardware, firmware, and/or software including one or more computer program instructions. As will be appreciated, any such computer program instructions may be loaded onto a computer or other programmable apparatus, e.g., processor 32, to produce a machine, such that the instructions which execute on the computer or other programmable apparatus (e.g., hardware) create means for implementing the functions specified in the block(s) or step(s) of the control flow diagram. These computer program instructions may also be stored in a computer-readable memory, e.g., memory 34, that may direct a computer or other programmable apparatus, e.g., processor, to function in a particular manner, such that the instructions stored in the computer-readable memory produce an article of manufacture including instruction means which implement the function specified in the block(s) or step(s) of the control flow diagram. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the control flow diagram.

Accordingly, blocks or steps of the control flow diagram support combinations of means for performing the specified functions, combinations of steps for performing the specified functions and program instruction means for performing the specified functions. It will also be understood that one or more blocks or steps of the control flow diagram, and combinations of blocks or steps in the control flow diagram, may be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended That which is claimed:

1. A method for transporting an asset along a track to a destination, the method comprising:
   receiving instructions relating to shipment of the asset to the destination;
   automatically determining a track-based route along which the asset is to be transported to the destination, wherein determining the route comprises determining at least one candidate route, determining an integrity of the track extending along the candidate route to the destination and identifying the candidate route as the track-based route in instances in which the integrity of the track extending along the candidate route is confirmed, wherein determining at least one candidate route comprises determining at least one candidate route based on at least one of a maximum slope encountered along a candidate route, a number of turns encountered along a candidate route, or a number of incline or decline sections encountered along a candidate route;
   determining if the track needs to be reconfigured to transport the asset and, when it is determined that the track does need to be reconfigured, automatically providing for reconfiguration of the track; and
   commencing and thereafter controlling movement of the asset in an autonomous manner along the track-based route after determining the integrity of the track and while continuing to monitor at least that portion of the track between the asset and the destination.

2. A method according to claim 1 further comprising:
   detecting a lack of integrity along the track between the asset and the destination while the asset is being moved along the track;
   automatically determining an alternative track-based route along which the asset is to be transported to the destination, wherein determining the alternative route comprises determining at least one candidate alternative route, determining an integrity of the track extending along the candidate alternative route and identifying the candidate alternative route as the alternative track-based route in instances in which the integrity of the track extending along the candidate alternative route is confirmed; and
   dynamically modifying the track-based route to avoid at least that portion of the track that lacks integrity by following the alternative track-based route after determining the integrity of the track extending along the alternative track-based route.

3. A method according to claim 1 wherein determining the integrity of the track comprises inspecting at least one of the track or a track bed utilizing at least one of radio frequency (RF) signals, infrared (IR) signals or time domain reflectometry (TDR).

4. A method according to claim 1 further comprising monitoring the asset while the asset is being moved along the track.

5. A method according to claim 4 wherein the asset is moved along the track in a railcar, and wherein the method further comprises monitoring the railcar while the railcar and the asset move along the track.

6. A method according to claim 4 wherein monitoring the asset comprises monitoring the asset with at least one of a thermal sensor, a strain gauge, radio frequency (RF) signals, infrared (IR) signals or video signals.

7. A method according to claim 1 further comprising providing for automated access to a source of the asset.

8. A method according to claim 1 further comprising monitoring regions forward and aft of the asset while the asset is moving along the track.

9. A computer apparatus for providing for transportation of an asset along a track to a destination, the computer apparatus comprising:
   a processor configured to receive instructions relating to shipment of the asset to the destination,
   wherein the processor is configured to determine a track-based route along which the asset is to be transported to the destination, wherein the processor is configured to determine the route by determining at least one candidate route, determining an integrity of the track extending along the candidate route to the destination and identifying the candidate route as the track-based route in instances in which the integrity of the track extending along the candidate route is confirmed, wherein the processor is configured to determine at least one candidate route by determining at least one candidate route based on at least one of a maximum slope encountered along a candidate route, a number of turns encountered along a candidate route, or a number of incline or decline sections encountered along a candidate route,
   wherein the processor is also configured to determine if the track needs to be reconfigured to transport the asset and, when it is determined that the track does need to be reconfigured, to automatically provide for reconfiguration of the track, and
   wherein the processor is further configured to commence and thereafter control movement of the asset in an autonomous manner along the track-based route after determining the integrity of the track and while continuing to monitor at least that portion of the track between the asset and the destination.

10. A computer apparatus according to claim 9 wherein the processor is further configured to detect a lack of integrity along the track between the asset and the destination while the asset is being moved along the track, and to automatically determine an alternative track-based route along which the asset is to be transported to the destination, wherein the processor is configured to determine the alternative route by determining at least one candidate alternative route, determining an integrity of the track extending along the candidate alternative route and identifying the candidate alternative route as the alternative track-based route in instances in which the integrity of the track extending along the candidate alternative route is confirmed, and wherein the processor is further configured to dynamically modify the track-based route to avoid at least that portion of the track that lacks integrity by following the alternative track-based route after determining the integrity of the track extending along the alternative track-based route.

11. A computer apparatus according to claim 9 wherein the processor is further configured to monitor the asset while the asset is being moved along the track.

12. A computer apparatus according to claim 11 wherein the asset is moved along the track in a railcar, and wherein the processor is further configured to monitor the railcar while the railcar and the asset move along the track.

13. A computer apparatus according to claim 9 wherein the processor is further configured to provide for automated access to a source of the asset.

14. A computer apparatus according to claim 9 wherein the processor is further configured to monitor regions forward and aft of the asset while the asset is moving along the track.

15. A computer program product comprising at least one computer-readable storage medium having computer-readable program instructions stored therein, the computer-readable program instructions comprising:

a first program instruction for determining a track-based route along which an asset is to be transported to a destination in response to instructions relating to shipment of the asset to the destination, wherein the first program instructions are configured to determine the route by determining at least one candidate route, determining an integrity of the track extending along the candidate route to the destination and identifying the candidate route as the track-based route in instances in which the integrity of the track extending along the candidate route is confirmed, wherein the first program instruction is configured to determine at least one candidate route by determining at least one candidate route based on at least one of a maximum slope encountered along a candidate route, a number of turns encountered along a candidate route, or a number of incline or decline sections encountered along a candidate route;

a second program instruction for determining if the track needs to be reconfigured to transport the asset and, when it is determined that the track does need to be reconfigured, for automatically providing for reconfiguration of the track; and a third program instruction for commencing and thereafter controlling movement of the asset in an autonomous manner along the track-based route after determining the integrity of the track and while continuing to monitor at least that portion of the track between the asset and the destination.

16. A computer program product according to claim 15 wherein the computer-readable program instructions further comprise:

a fourth program instruction for detecting a lack of integrity along the track between the asset and the destination while the asset is being moved along the track;

a fifth program instruction for automatically determining an alternative track-based route along which the asset is to be transported to the destination, wherein the fifth program instruction is configured to determine the alternative route by determining at least one candidate alternative route, determining an integrity of the track extending along the candidate alternative route and identifying the candidate alternative route as the alternative track-based route in instances in which the integrity of the track extending along the candidate alternative route is confirmed; and a sixth program instruction for dynamically modifying the track-based route to avoid at least that portion of the track that lacks integrity.

17. A computer program product according to claim 15 wherein the computer-readable program instructions further comprise a fourth program instruction for monitoring the asset while the asset is being moved along the track.

18. A computer program product according to claim 17 wherein the asset is moved along the track in a railcar, and wherein the computer-readable program instructions further comprise a fifth program instruction for monitoring the railcar while the railcar and the asset move along the track.

19. A computer program product according to claim 15 wherein the computer-readable program instructions further comprise a fourth program instruction for providing for automated access to a source of the asset.

20. A computer program product according to claim 15 wherein the computer-readable program instructions further comprise a fourth program instruction for monitoring regions forward and aft of the asset while the asset is moving along the track.

* * * * *